UNITED STATES PATENT OFFICE.

ZACHARIAS OLSSON, OF UPSALA, SWEDEN, ASSIGNOR TO GUNNAR SIGGE ANDREAS APPELGVIST, OF STOCKHOLM, SWEDEN.

PROCESS OF PRODUCING OBJECTS FROM PLASTIC MATERIAL.

954,991.  Specification of Letters Patent.  Patented Apr. 12, 1910.

No Drawing.  Application filed October 23, 1906. Serial No. 340,146.

*To all whom it may concern:*

Be it known that I, ZACHARIAS OLSSON, a subject of the King of Sweden, and a resident of Upsala, in the Kingdom of Sweden, have invented certain Improvements in the Process of Producing Objects from Plastic Material, of which the following is a specification.

This invention relates to certain improvements in the manufacture of plastic materials, and more particularly in that class of such materials, which are produced from gluey or gelatinous materials adapted to be hardened or coagulated by a coagulant or hardening agent capable of being energized by the action of light, and the object of the invention is to provide a process for the manufacture of such plastic materials, presenting certain features of novelty and advantage, whereby the plastic materials may be formed or molded in a convenient and simple manner without undue interference from too rapid operation of the coagulant or hardening ingredient, The invention consists in a process of manufacturing such plastic substances containing a coagulant or hardening agent capable of being energized by the action of light, wherein the chemical action of the light is controlled and regulated in a novel and effective manner, so as to retard the operation of said coagulant or hardening agent during the operation of molding or forming the plastic mass.

My improved process is particularly well adapted for employment in the manufacture of such plastic substances as are produced from gluey or gelatinous matters mixed with hygroscopic substances, such as glycerin, or the chlorids of calcium and magnesium, for example, with or without a filling ingredient, and wherein a suitable chromate is employed as a hardening agent or coagulant to harden and set the plastic mass. Heretofore the practical employment of such plastic substances has been almost impossible by reason of the fact that, after the addition of the chromate to the viscous mass formed by the admixture of the gluey or gelatinous matter with the hygroscopic substance, the mass will lose its fluid character and will set or coagulate so rapidly as to prevent it from being poured into molds. Furthermore, the action of the chromate results in the formation of a hard and brittle superficial shell at the surface of the mass, while the interior of the mass remains soft and gelatinous by reason of the discharge or evaporation of the water being prevented.

In carrying out my invention in practice, I preferably add to the viscous mass produced by the admixture of the gluey or gelatinous matter with the hygroscopic substance, a suitable coloring or colored substance, the addition of such coloring or colored substance to the viscous mass being effected prior to or simultaneously with the incorporation of the chromate or coagulant, in such a manner as to impart to the mass such a coloration as will serve to retard or inhibit the chemical action of light upon which the operation of the coagulant in hardening or setting the mass is dependent, and thereby permit of effectively regulating and controlling the operation of said coagulant so as to retard the action thereof during the molding or forming of the plastic mass and to prevent unduly rapid hardening or coagulation such as has hitherto prevented the practical utilization of such plastic substances, and to insure uniform operation of the coagulant throughout the entire mass.

The colored or coloring matters to be added to the viscous mass as above set forth are such as will serve to inhibit or retard the chemical action of the light, and for this purpose should be such as will impart to the viscous mass a red, blue, yellow or dark coloration, or a combination of two or more of such colors. Among such coloring or colored matters as are capable of practical employment according to my invention may be mentioned lamp black; cinnabar; bolus; minium; ocher; ultramarine; anilin colors, etc. Such coloring or colored matters should usually be added to the viscous mass in the proportion of from about 0.4 per cent. to about 1.5 per cent. of the dry gluey or gelatinous matter contained in the mass.

In carrying out the process as above set forth care should ordinarily be taken to distribute the coloring or colored matters evenly throughout the viscous mass, so that the operation of the chromate or other coagulant may be the more effectively and uniformly controlled in order that the mass may set or coagulate slowly and uniformly and that sufficient time may be allowed for pouring the mass into the molds.

The coloring or colored matters may also be advantageously mixed with paraffin oil, mineral oil, fats or the like, prior to incorporation with the viscous mass, the employment of such oils or fats serving to materially increase the pliability and durability of the finished product and also to increase the elasticity thereof.

The present invention provides a method of forming or molding objects from masses, the said masses being in many respects equal to natural gum or caoutchouc. The production of formed or molded objects from such masses by molding has hitherto been almost impossible by reason of the fact that the mass will, after the addition of the chromates, harden and become set so swiftly, that it cannot be poured into and fill the molds. By adding the coloring or colored matter the chemical action of the light is inhibited, as before stated, and the oxidizing of the mass is retarded so that the mass becomes set relatively slowly so that it can be poured into the molds and fill them completely.

Having thus described my invention, what I claim and desire to secure by Letters Patent is—

1. The herein described improved process of producing objects from plastic materials, which consists in mixing gelatinous substances with a hardening ingredient capable of being energized by the action of light, imparting to such material prior to the hardening thereof, a coloration adapted to inhibit the chemical action of light and then molding such material.

2. The herein described improved process of producing objects from plastic material, which consists in mixing gluey and hygroscopic substances with a hardening ingredient capable of being energized by the action of light, incorporating with such mixture, prior to the hardening thereof, a substance capable of imparting to such mixture a coloration adapted to inhibit the chemical action of light and then molding such material.

3. The herein described improved process of producing objects from plastic material, which consists in mixing gelatinous substances with a chromate adapted to be energized to harden such gelatinous substances when exposed to the action of light, imparting to such mixture prior to the hardening thereof, a coloration adapted to retard the chemical action of light, and finally forming such colored mixture into shape prior to the hardening thereof.

4. The herein described improved process of producing objects from plastic material which consists in mixing gelatinous substances with a hardening ingredient capable of being energized by the action of light, incorporating with such mixture, prior to the hardening thereof, a substance capable of imparting to such mixture a coloration adapted to inhibit the chemical action of light, said coloring substance being in the proportion of from about 0.4 to about 1.5 per cent. of the dry weight of the gelatinous substance, and finally forming said colored mixture into shape prior to the hardening thereof.

5. The herein described process of producing objects from plastic material, which consists in mixing gelatinous substances with a hardening ingredient capable of being energized by the action of light, incorporating with such mixture, prior to the hardening thereof, a fatty substance and a substance capable of imparting to such mixture a coloration adapted to inhibit the chemical action of light, and then molding said material.

In witness whereof, I have hereunto signed my name in the presence of two subscribing witnesses.

ZACHARIAS OLSSON.

Witnesses:
 CARL FRIBERG,
 AXEL EHRNER.